(12) United States Patent
Walker

(10) Patent No.: US 10,855,611 B2
(45) Date of Patent: Dec. 1, 2020

(54) MULTI-SOURCE CREDIT MANAGEMENT

(71) Applicant: Hewlett Packard Enterprise Development LP, Houston, TX (US)

(72) Inventor: Kaitlyn Margaret-Marie Walker, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 218 days.

(21) Appl. No.: 15/401,350

(22) Filed: Jan. 9, 2017

(65) Prior Publication Data
US 2018/0198724 A1    Jul. 12, 2018

(51) Int. Cl.
H04L 12/801    (2013.01)
H04L 12/841    (2013.01)
H04L 12/835    (2013.01)

(52) U.S. Cl.
CPC .............. H04L 47/39 (2013.01); H04L 47/30 (2013.01)

(58) Field of Classification Search
CPC ............................................. H04L 47/00–829
See application file for complete search history.

(56) References Cited

U.S. PATENT DOCUMENTS

| | | | | |
|---|---|---|---|---|
| 7,675,929 B1* | 3/2010 | Davis | ............. | H04L 47/10 370/235.1 |
| 8,014,288 B1* | 9/2011 | MacAdam | ............. | H04L 47/10 370/235 |
| 2001/0043564 A1* | 11/2001 | Bloch | ............. | H04L 12/4604 370/230 |
| 2011/0075555 A1* | 3/2011 | Ziegler | ............. | H04L 49/505 370/229 |
| 2013/0315236 A1* | 11/2013 | Scrobohaci | ............. | H04L 47/52 370/389 |
| 2015/0081941 A1* | 3/2015 | Brown | ............. | G06F 13/362 710/116 |
| 2016/0261513 A1* | 9/2016 | Aingaran | ............. | H04L 47/30 |

OTHER PUBLICATIONS

Javier Prades Gasulla, A new Credit-Based End-to-End Flow Control Protocol for High Performance Interconnects, pp. 1-67 (Year: 2015).*
Traffic Management for High-Speed Networks: Fourth Lecture International Science Lecture Series (1997), The National Academies Press OpenBook, Retrieved Nov. 29, 2016, 14 Pgs.

* cited by examiner

*Primary Examiner* — Benjamin H Elliott, IV
*Assistant Examiner* — Prince A Mensah
(74) *Attorney, Agent, or Firm* — Sheppard Mullin Richter & Hampton LLP

(57) ABSTRACT

Examples herein involve managing credit returns in a multi-source credit managed communication system. In examples herein, a first amount of slots of a credit managed destination are allocated for a credit managed source and a second amount of slots of the credit managed destination are allocated for a secondary source. Credit returns are controlled to the credit managed source based on the second amount of slots and in response to a value of a counter that tracks an amount of data sent from the secondary source to the credit managed destination, an amount of data sent from the credit managed destination, the credit returns providing an ability for the first source to send data to the credit managed destination.

17 Claims, 6 Drawing Sheets

MULTI-SOURCE CREDIT MANAGEMENT

BACKGROUND

Credit managed communication may be utilized in controlling sending and receiving of data between a credit managed source and a credit managed destination of a computing system (e.g., a node of a network). In a credit managed communication system, destinations may be allocated a particular number of credits that may be communicated to sources. Once a destination has open slots in a memory, such as a buffer, (e.g., by transmitting, sending, or releasing data), a credit may be returned to the source indicating that the source of the destination may then send a new set of data (e.g., packets) to the destination. However, a destination may not successfully store or receive data when the allocation limit of the destination has been reached (i.e., when the destination is storing the maximum amount of data or packets allocated to the destination or the maximum capacity of the destination has been reached).

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
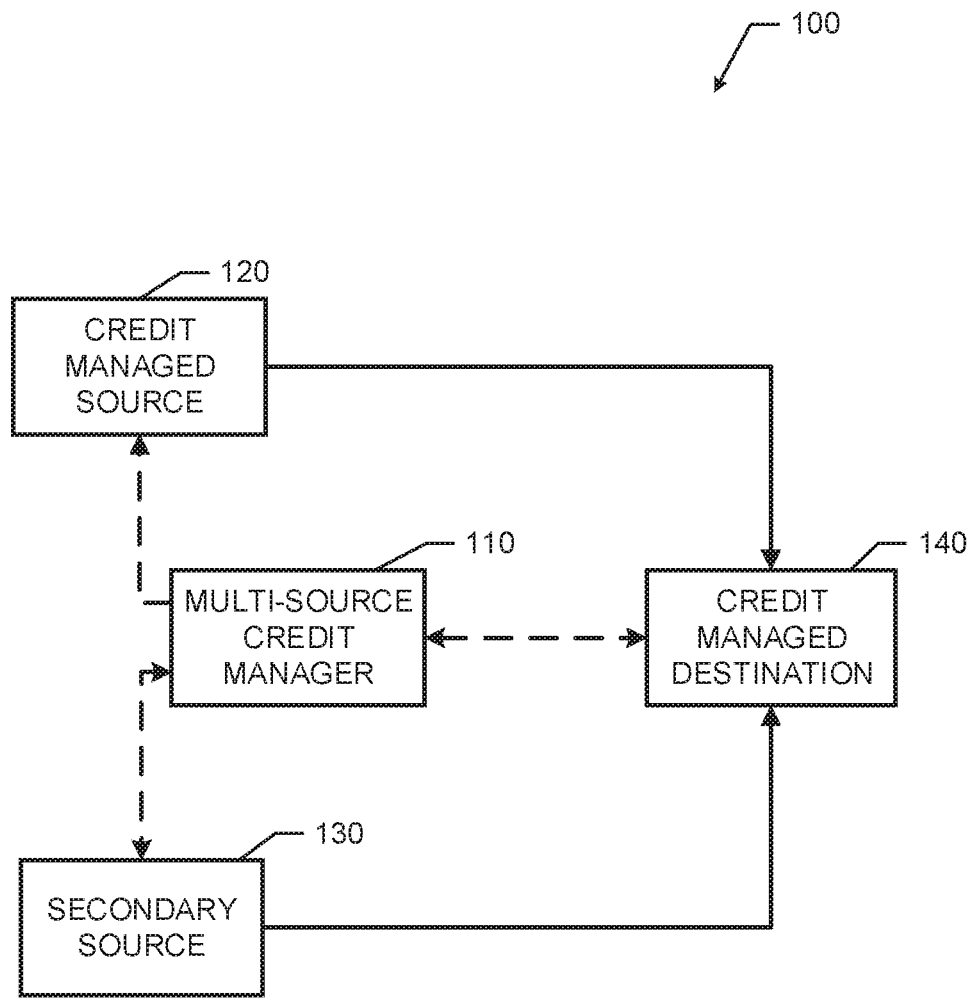
FIG. 1 illustrates a block diagram of an example credit managed communication system including a multi-source credit manager that may be implemented in accordance with an aspect of this disclosure.

Examples disclosed herein involve managing credit returns in a credit managed communication system. In examples herein, a multi-source credit manager may control credit returns to a credit managed source and/or a secondary source of a credit managed destination. The example secondary source may or may not be a credit managed source.

In credit managed communications, whenever data leaves a credit managed destination, a credit return is sent to a credit managed source of the destination. However, the data that leaves the credit managed destination may not necessarily be credit managed data (or data that was received from the credit managed source) or may not be credit managed data for a particular source that receives the credit return if the credit managed destination receives data from multiple sources, whether they are all credit managed sources or not. Accordingly, in a multiple source, single destination credit managed system, credit managed sources may improperly receive credit returns when data leaves the credit managed destination. Further, credit managed destinations may receive more data than can be handled, resulting in loss of data from the sources because the received data may be discarded or dropped (e.g., packet loss). Examples herein provide for a multi-source credit manager to control credit returns to a credit managed source of a credit managed destination that also receives data from a secondary source. The example multi-source credit manager may implement a counter used to control credit returns and/or a ready signal to the sources of the credit managed destination based on an amount of slots allocated for a secondary source in the credit managed destination, an amount of data sent from the credit managed destination, and an amount of data sent from the secondary source to the credit managed destination. The value of the counter may be used to determine when to send credit returns to a credit managed source of the credit managed destination and/or a ready signal or credit returns to a secondary source of the credit managed destination. Accordingly, the credit managed source may not receive credit returns each time data is released from the credit managed destination to ensure that data subsequently sent the credit managed destination is not lost.

An example method includes allocating a first amount of slots of a credit managed destination for a credit managed source and a second amount of slots of the credit managed destination for a secondary source. The example method may further include controlling credit returns to the credit managed source based on the second amount of slots and in response to a value of a counter that tracks an amount of data sent from the secondary source to the credit managed destination, an amount of data sent from the credit managed destination. The example credit returns provide an ability for the credit managed source to send data to the credit managed destination.

As used herein, when referring to a credit managed communication system, a credit managed source, or a credit managed destination, such components are controlled by or include a credit communication protocol that enables the sending and receiving of data based on a credit system in which credits are allocated to a credit managed source based on an allocation of memory for credit managed data in a credit managed destination. Further, in examples herein, a non-credit managed source may not send credit managed data or be controlled by credit returns. As used herein, a slot of memory (which may be used interchangeably with a slot of a buffer or a slot of a credit managed destination) refers to a unit of memory corresponding to a set amount of space of the memory. For example, a slot of a memory may store a single credit's worth of data for a credit managed communication system.

FIG. 1 is a block diagram of an example credit managed communication system 100 (which may be referred to herein as the system 100) including a multi-source credit manager 110 implemented in accordance with examples herein. The example credit managed communication system 100 of FIG. 1 includes the multi-source credit manager 110, a credit managed source 120, a secondary source 130, and credit managed destination 140. Accordingly, the example credit managed communication system 100 of FIG. 1 is a multi-source, single destination credit managed system. The example credit managed communication system 100 may be a network, a node of a network, a communication device, or any other type of computing device or network device.

In examples herein, the multi-source credit manager 110 controls credit returns to the credit managed source 120 by allocating slots (e.g., units of memory, such as a set number of bits, bytes, etc. of a buffer) of the credit managed destination 140 and monitoring data released (e.g., popped) from the credit managed destination 140 and data sent by the secondary source 130. Accordingly, the multi-source credit manager 110 may authorize multiple sources (i.e., the credit managed source 120 and secondary source 130) to transmit data to a single credit managed destination 140 (e.g., the credit managed destination 140) without exceeding a credit limit (or maximum allotted memory limit) of the credit managed destination 140.

The example credit managed source 120 sends credit managed data (e.g., packets) to the credit managed destination 140 when the credit managed source 120 has available credits to send to the credit managed destination 140. The example credit managed data may be sent in a predetermined size or unit of data. The example credit managed source 120 may be issued credits to send data to the credit managed destination 140. In the example system 100 of FIG. 1, the multi-source credit manager 110 issues the credits (e.g., each credit may be a set unit of data or amount of data) to the credit managed source 120 based on an available amount of slots of a memory of the credit managed destination 140. In examples herein, the multi-source credit manager 110 provides credits (or credit returns) based on an allocation of an amount of slots for the secondary source 130 in the credit managed destination 140 and the amount of data sent from the secondary source 130 to the credit managed destination 140 at a particular point in time.

The example secondary source 130 sends data to the credit managed destination 140 when authorized by the multi-source credit manager 110. In examples herein, the secondary source 130 may be a non-credit managed source (e.g., a source that does not send credit managed data based on receiving credits to send data to the credit managed destination 140) or a credit managed source (e.g., similar to the credit managed source 120). In examples herein, when the secondary source 130 is a non-credit managed source, the example secondary source 130 may monitor a ready signal that is controlled by the multi-source credit manager 110. The ready signal indicates when the secondary source 130 is able (or is not able) to send data to the credit managed destination 140. When the example secondary source 130 is a credit managed source, the secondary source 130 sends data to the credit managed destination 140 when the secondary source 130 has available credits to send data. The credits to send data are controlled by the multi-source credit manager 110.

In examples herein, when the secondary source 130 sends a unit of data (which may be referred to herein as a pop) to the credit managed destination 140, the secondary source 130 notifies the multi-source credit manager 110 of the data sent, for example, via a pop notification. The example multi-source credit manager 110 uses the pop notifications to control the ready signal or credit returns to the secondary source 130 in accordance with examples herein.

The example credit managed destination 140 of FIG. 1 receives data from the credit managed source 120 and the secondary source 130. In examples herein, the credit managed destination 140 may include a memory, such as a buffer (e.g., a FIFO buffer), that has an allotted amount of space (e.g., all or part of an entire capacity of the memory) for receiving data from the credit managed source 120 and the secondary source 130. The example multi-source credit manager 110 may allocate slots of memory (e.g., which may be referred to herein as slots) of the credit managed destination 140 (or buffer of the credit managed destination 140) for data received from the credit managed source 120 and the secondary source 130. For example, the multi-source credit manager 110 may allocate a first amount of slots of the credit managed destination 140 for the credit managed source 120 and a second amount of slots of the credit managed destination 140 for the secondary source 130. The credit managed destination 140 of FIG. 1 notifies the multi-source credit manager 110 when a unit of data (e.g., corresponding to a credit sized amount of data) is released (or popped) from the credit managed destination 140. The example data may be released or sent to any other device or system in communication with the credit managed system 100 of FIG. 1. In examples herein, the multi-source credit manager 110 utilizes the notifications from the credit managed destination 140 and the allocations of slots of the credit managed destination 140 to control credit returns (a ready signal) for the credit managed source 120 and the secondary source 130.

Accordingly, in examples herein, the multi-source credit manager 110 utilizes pop notifications from the secondary source 130 and credit managed destination 140 along with the allocations of slots of the credit managed destination to control credit returns to the credit managed source 120 and/or credit returns or a ready signal to the secondary source 130. As such, the credit managed destination 140, as a single destination, may receive data from multiple sources (the credit managed destination 120 and the secondary source 130) without monitoring which data is popped from the credit managed destination 140. In other words, regardless of whether data popped from the credit managed destination 140 is from the credit managed source 120 (i.e., credit managed data) or from the secondary source 130 (i.e., either credit managed data or non-credit managed data), the multi-source credit manager 110 controls the credit returns of the credit managed destination 140 to ensure continued operation of the credit managed destination 140 without loss of data.

Figure 2:
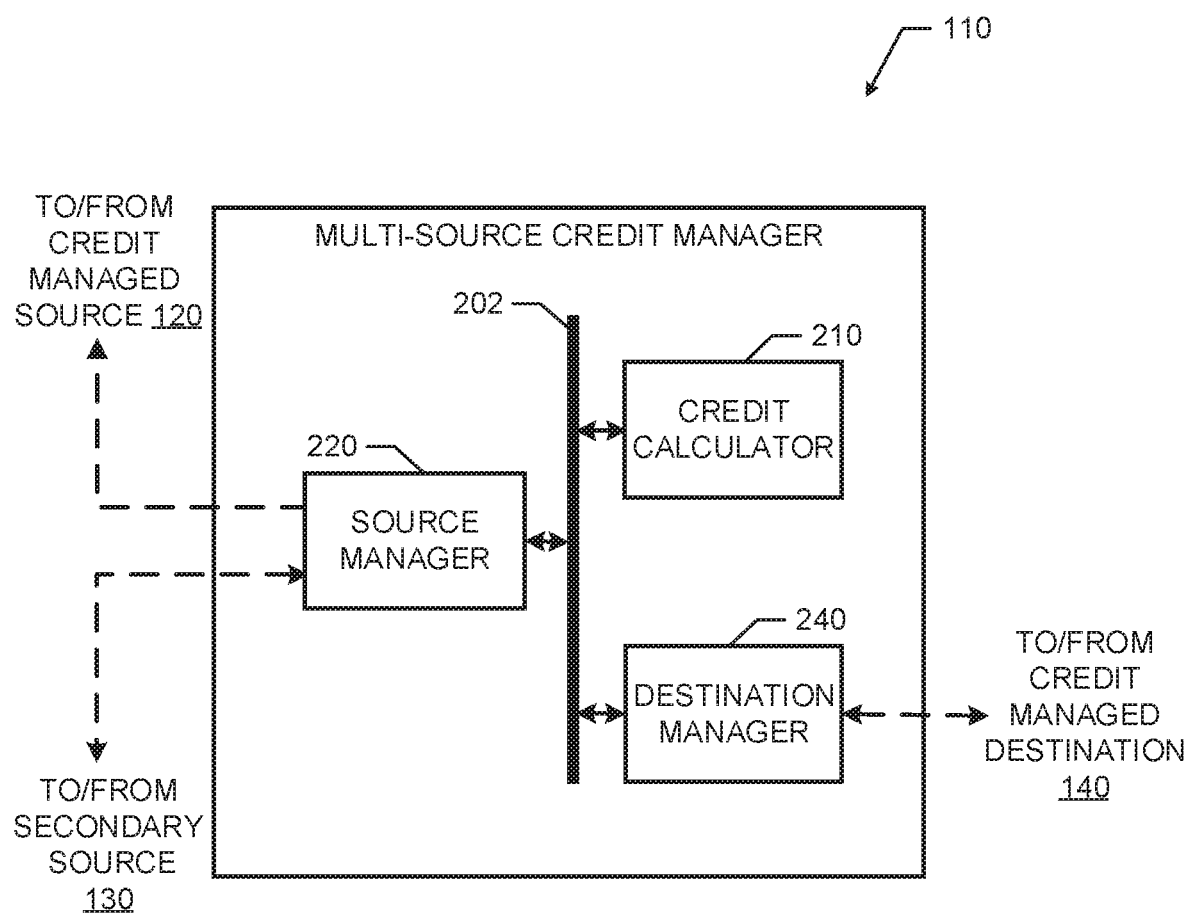
FIG. 2 is a block diagram of an example multi-source credit manager that may be used to implement the multi-source credit manager of FIG. 1.

FIG. 2 is a block diagram of an example multi-source credit manager 110 that may be used to implement the example multi-source credit manager 110 of FIG. 1. The example multi-source credit manager 110 of FIG. 2 includes a credit calculator 210, a source manager 220, and a destination manager 240. In the example of FIG. 1, a communication bus 202 facilitates communication between the credit calculator 210, the source manager 220, and the destination manager 240. In examples herein, the source manager 220 facilitates communication with the credit managed source 120 and the secondary source 130, the destination manager 240 facilitates communication with the credit managed destination 140, and the credit calculator 210 maintains a counter based on the communications to/from the source manager 220 and the destination manager 240. Accordingly, in examples herein, the source manager 220 may indicate when the credit managed source 120 (e.g., via credit returns) or the secondary source 130 (e.g., via credit returns or a ready signal) may send data to the credit managed destination 140.

The example credit calculator 210 of FIG. 2 analyzes notifications received by the source manager 220 and the destination manager 240 to maintain a counter used to determine when the credit managed source 120 or the secondary source 130 may send data to the credit managed destination 140. The example credit calculator 210 receives information from the destination manager 240 indicating the amount of slots of the credit managed destination 140 that are allocated for the credit managed source 120 and the secondary source 130. Additionally, the credit calculator 210 may receive pop notifications from the source manager 220 and/or the destination manager 240 indicating when the secondary source 130 and/or the credit managed destination 140, respectively, sends or releases data (referred to herein as a pop). The credit calculator 210 adjusts the value of the counter based on this information and communicates instructions to the source manager 220 to indicate whether the credit managed source 120 or the secondary source 130 may send data to the credit managed destination 140 based on the value of the counter.

In examples herein, the credit calculator 210 increments the counter for each pop notification received from the secondary source 110 via the source manager 220 and decrements the counter for each pop notification received from the credit managed destination 140 via the destination manager 240. In examples herein, when the secondary source 130 is a non-credit managed source the credit calculator 210 instructs the source manager 220 to set or adjust a ready signal for the secondary source 130 that indicates when the secondary source 130 can send data to the credit managed destination 140. For example, when the credit calculator 210 determines that the counter is equal to the amount of slots of the credit managed destination 140 that are allocated for the secondary source 130, the credit calculator 210 may instruct the source manager 220 to deassert a ready signal for the secondary source 130, indicating that the secondary source 130 may not send data to the credit managed destination 140. In such an example, if the counter is less than the number of slots allocated for the secondary source 130 and greater than zero when a pop notification is received from the credit destination manager 140, the credit calculator 210 may instruct the source manager 220 to assert (or affirm) the ready signal for the secondary source 130, indicating that the secondary source 130 may send data to the credit managed destination 140. On the other hand, in examples herein, when the secondary source 130 is a credit managed source, the credit calculator 210 may instruct the source manager 220 not to send credit returns to the secondary source 130 when the counter is equal to the allocated amount of slots of the credit managed destination 140 and to send credit returns when the counter is less than the amount of slots allocated for the secondary source 130 and greater than zero.

The example credit calculator 210 controls the credit returns to the credit managed source 120 based on the counter. In examples herein, when the credit calculator 210 determines that the counter is equal to zero and a pop notification is received from the credit managed destination, the credit calculator 210 may instruct the source manager 220 to send a credit return to the credit managed source 120. In such examples, the multi-source credit manager 110 of FIG. 2 allows the credit managed source 120 to send data the credit managed destination 140 without exceeding a maximum capacity of the credit managed destination 140. Furthermore, in such an example, since the counter is equal to zero, the credit calculator 210 does not decrement the counter as the counter value cannot be less than zero. As such, the multi-source credit manager 110 of FIG. 2 allows for return of credits to the credit managed source 120 (and/or the secondary source 130) without monitoring the source of the data popped from the credit destination manager 140.

As mentioned above, the example source manager 220 of FIG. 2 serves as an interface for the multi-source credit manager 110 to communicate with and/or control credit returns to the credit managed source 120 and the secondary source 130 to authorize the credit managed source and the secondary source 130 to send data to the credit managed destination 140. The example source manager 220 may receive pop notifications form the secondary source 130 and forward the pop notification to the credit calculator 210 to adjust (e.g., increment) the counter accordingly. In some examples, the source manager 220 may monitor the secondary source for pops. Furthermore, the source manager 220 communicates credit returns to the credit managed source 120 and a ready/not ready signal or credit returns to the secondary source 130 based on instructions from the credit calculator 210 and/or the counter value when a pop from the credit managed destination 140 occurs.

The example destination manager 240 of FIG. 2 serves as an interface for the multi-source credit manager 110 to communicate with and/or control the credit managed destination 140. In examples herein, the destination manager 140 may control the credit managed destination 140 may allocating an amount of slots of the credit managed destination 140 (or of a buffer of the credit managed destination 140) for the credit managed source 120 and/or the secondary source 130. The example destination manager 140 may allocate the amount based on settings of the credit managed system 100, based on an input or instructions from a user of the credit managed system 100, based on a percentage of available capacity of the credit managed destination 140, etc. Additionally, the destination manager 240 may receive pop notifications from the credit managed destination 140 and forward the pop notifications to the credit calculator 210 to adjust (e.g., decrement) the counter accordingly. In some examples, the destination manager 240 may monitor the credit managed destination 140 for pops.

Accordingly, the multi-source credit manager 110 of FIG. 2 may control credit returns to the credit managed source 120 and a ready signal or credit returns to the secondary source 130 based on pops from the credit managed destination 140 (regardless of the source of the data in the pops), based on an allocated amount of slots for the secondary source 130 in the credit managed destination 140, and an amount of pops from the secondary source 130. As such, the multi-source credit manager 110 adjusts a counter (see FIG. 5) based on the timing of the pops from the secondary source 130 and the credit managed destination 140 to control the credit returns to the credit managed source 120 and/or credit returns or ready signal to the secondary source 130.

While an example manner of implementing the multi-source credit manager 110 of FIG. 1 is illustrated in FIG. 2, at least one of the elements, processes and/or devices illustrated in FIG. 2 may be combined, divided, re-arranged, omitted, eliminated and/or implemented in any other way. Further, the credit calculator 210, the source manager 220, the destination manager 240 and/or, more generally, the example multi-source credit manager 110 of FIG. 2 may be implemented by hardware and/or any combination of hardware and executable instructions (e.g., software and/or firmware). Thus, for example, any of the credit calculator 210, the source manager 220, the destination manager 240 and/or, more generally, the example multi-source credit manager 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the credit calculator 210, the source manager 220, and/or the destination manager 240 is/are hereby expressly defined to include a tangible machine readable storage device or storage disk such as a memory, a digital versatile disk (DVD), a compact disk (CD), a Blu-ray disk, etc. storing the executable instructions. Further still, the example multi-source credit manager 110 of FIG. 2 may include at least one element, process, and/or device in addition to, or instead of, those illustrated in FIG. 2, and/or may include more than one of any or all of the illustrated elements, processes and devices.

Figure 3:
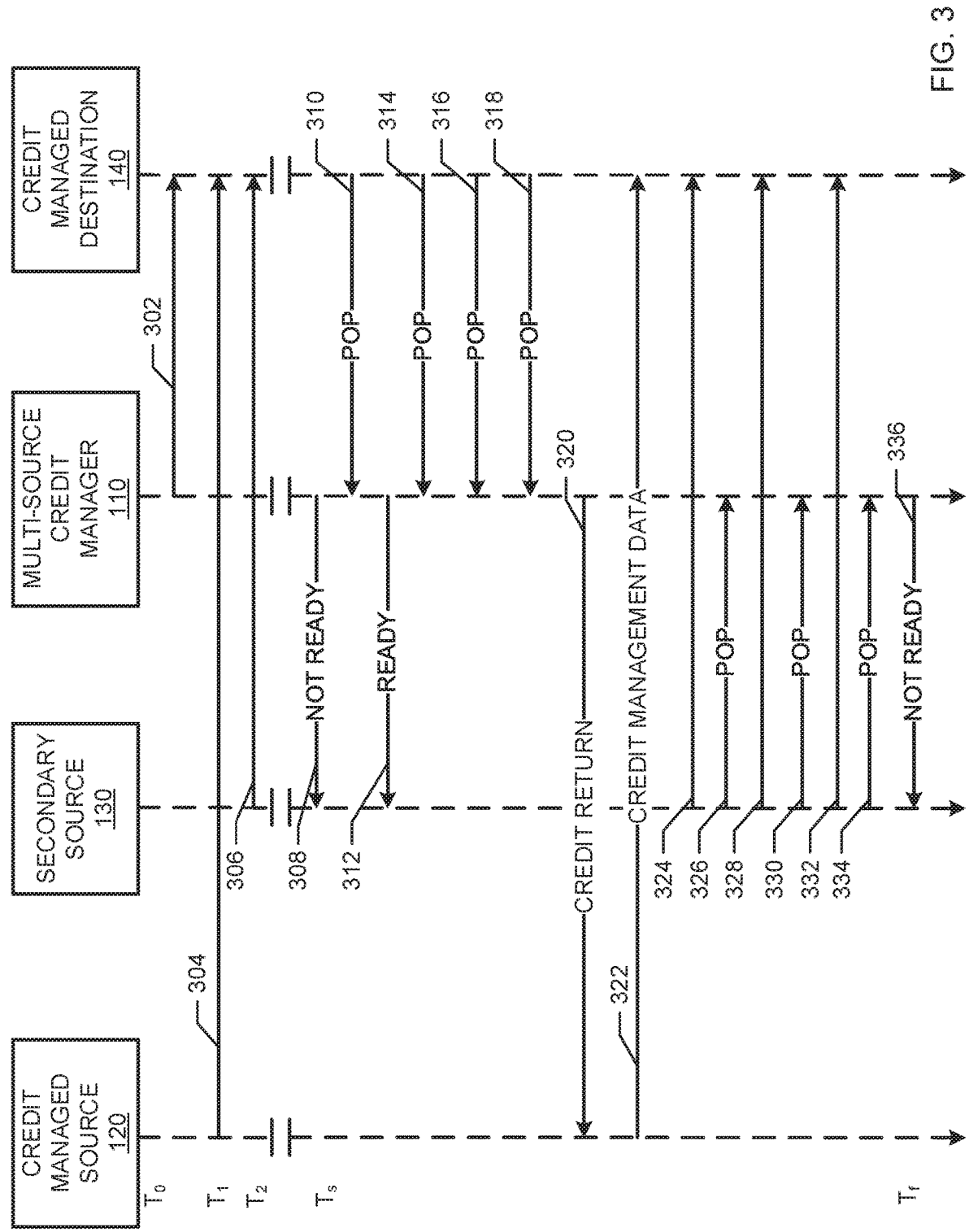
FIG. 3 is an example message diagram representative of example communications that may be sent between components of the credit managed communication system of FIG. 1.

FIG. 3 is a message flow diagram of an example series of communications between the components 110-140 of the example credit management system 100 of FIG. 1. The example series of communications are provided to illustrate a sequence of operations resulting from the communications. Other sequences of communications may be implemented. In the example of FIG. 3, communications are shown as arrows between the components over time during two time periods (as shown the break in timelines for the components), from $T_0$ to $T_2$ and from $T_s$ to $T_f$. During the first time period (from $T_0$ to $T_2$), the credit managed destination 140 is configured and the credit managed source 120 and secondary source 130 send data to the credit managed destination 140 to reach the maximum capacity of the credit managed destination 140. More specifically, at time $T_0$, the example multi-source credit manager 110 (e.g., via the destination manager 240) allocates an amount of slots of the credit managed destination 140 with message 302. In the example of FIG. 3, the multi-source credit manager 110 allocates three slots of the credit managed destination 140 for the secondary source 130. In some examples, at time $T_0$, the multi-source credit manager 110 may also allocate another amount of slots for the credit managed source 120. At time $T_1$, the credit managed source 120 sends credit managed data 304 to the credit managed destination. At time $T_2$, the secondary source 130 sends data to fill the three slots of the credit managed destination 140 for data from the secondary source 130.

Accordingly, after time $T_2$, the three slots of the credit managed destination 140 allocated for the secondary source 130 have been filled. Thus, at time $T_s$, because the maximum amount of data from the secondary source 130 is in the credit managed destination 140, the multi-source credit manager 110 deasserts the ready signal by sending not ready signal 308 (e.g., the counter=amount of slots allocated for secondary source 130=3). In some examples, if the secondary source is a credit managed source, rather than a not ready signal 308 being transmitted to the secondary source 130, the multi-source credit manager 110 may not send any credit returns to the secondary source 130 at time $T_s$.

Between Time $T_s$ and Time $T_f$ a series of example communications are made to manage credit returns to the credit managed source 120 and/or a ready signal to the secondary source 130. After time $T_s$ the credit managed destination 140 sends a pop notification 310 to the multi-source credit manager 110 when the credit managed destination 140 sends or releases data from its buffer (e.g., to a device or network in communication with the system 100). In response to receiving the pop notification, the multi-source credit manager 110 sends a ready signal 312 to the secondary 130 because the counter would be less than the maximum amount of slots for the secondary source 130 and greater than zero (e.g., counter value=3−1=2). Additionally, in the example of FIG. 3, the credit managed destination 140 sends three pop notifications 314, 316, 318 after ready signal 312 to the multi-source credit manager 140. As such, the multi-source credit manager 110 decrements the counter to zero after pop notifications 314, 316 (counter value=2−1−1=0), and sends a credit return 320 after pop notification 318 because all slots are open for the secondary source 130, indicating availability for credit managed data in the credit managed destination 140. Accordingly, in response to receiving the credit return, the credit managed source 120 sends credit managed data 322 to the credit managed destination 140.

After the credit managed source 120 sends the credit managed data, the secondary source sends data 324, 328, 332 to the credit managed destination followed respectively by pop notifications 326, 330, 334 to the multi-source credit manager 110. In response to receiving the three pop notifications 326, 330, 334, at time $T_f$ the multi-source credit manager 110 sends a not-ready signal 336 to the secondary source 130 as the allocated slots of the credit managed destination have been filled (e.g., counter=amount of slots allocated for secondary source 130=0+1+1+1=3).

Figure 4:
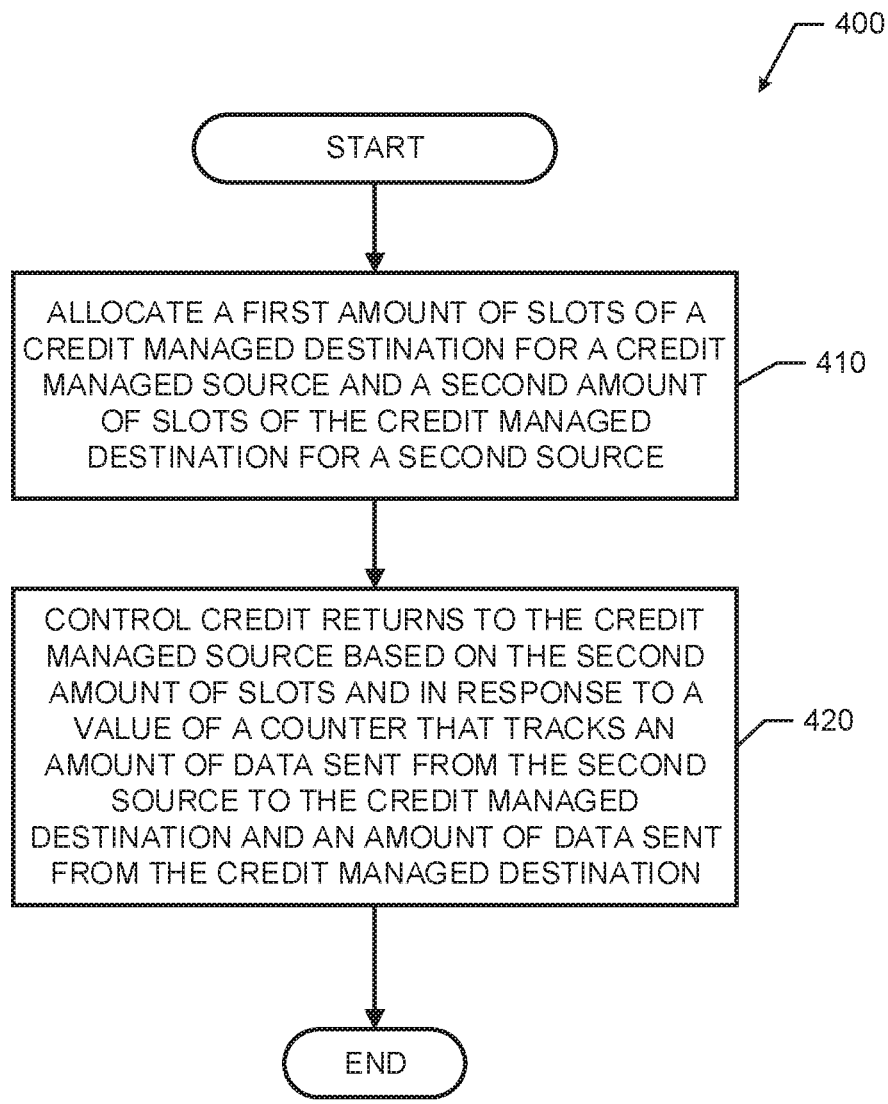
FIG. 4 is a flowchart representative of example machine readable instructions that may be executed to implement the multi-source credit manager of FIG. 2.

Flowcharts representative of example machine readable instructions for implementing the multi-source credit manager 110 of FIG. 2 is shown in FIG. 4. In this example, the machine readable instructions comprise a program(s)/process(es) for execution by a processor such as the processor 612 shown in the example processor platform 600 discussed below in connection with FIG. 6. The program(s)/process (es) may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 612, but the entire program/ process and/or parts thereof could be executed by a device other than the processor 612 and/or embodied in firmware or dedicated hardware. Further, although the example program (s)/process(es) is/are described with reference to the flowchart illustrated in FIG. 4, many other methods of implementing the example multi-source credit manager 110 may be used. For example, the order of execution of the blocks may be changed, and/or some of the blocks described may be changed, eliminated, or combined.

The example process 400 of FIG. 4 begins with an initiation of the multi-source credit manager 110 (e.g., upon startup, upon instructions from a user, upon startup of a device or system implementing the multi-source credit manager 110 (e.g., the system 100), etc.). The example process 400 may be implemented to managed credit returns to a credit managed source (e.g., the credit managed source 120 of FIG. 1) when a credit managed destination (e.g., the credit managed destination 140) receives credit managed data and/or non-credit managed data from multiple sources (e.g., the credit managed source 120 and the secondary source 130).

At block 410 of FIG. 4, the destination manager 240 allocates a first amount of slots of the credit managed destination 140 for the credit managed source 120 and a second amount of slots of the credit managed destination 140 for the secondary source 130. At block 420, the source manager 220 controls credit returns to the credit managed source 120 based on the second amount of slots and in response to a value of a counter that tracks an amount of data sent from the secondary source 130 to the credit managed destination and an amount of data sent from the credit managed destination 140. The example credit returns of block 420 enable the credit managed source 120 to send credit managed data to the credit managed destination 140. In some examples, the credit calculator 210 adjusts (e.g., increments and decrements) based on pop notifications from the secondary source 130 and the credit managed destination 140 indicating when the data is sent from the secondary source 130 and the credit managed destination 140, respectively. For example, the credit calculator 210 may implement a process, such as the process 500, to manage the counter.

Figure 5:
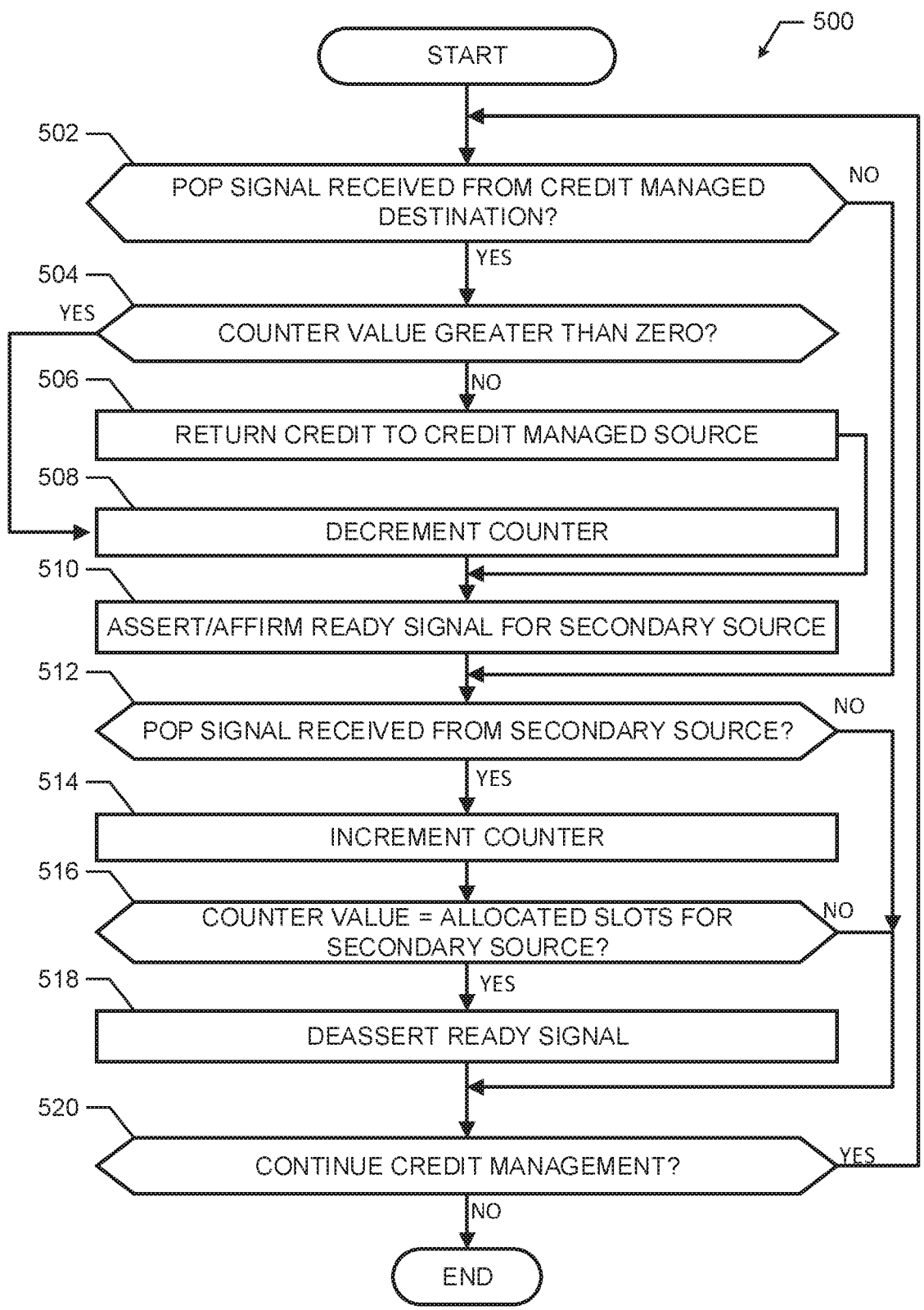
FIG. 5 is a flowchart representative example machine readable instructions that may be executed to implement an example portion of the example machine readable instructions of FIG. 4 to implement the multi-source credit manager of FIG. 2.

The example process 500 of FIG. 5 begins with an initiation of the multi-source credit manager 110. The example process 500 of FIG. 5 may be used to implement block 420 of FIG. 4 to control credit returns and/or a ready signal to the credit managed source 120 and/or the secondary source 130, respectively. At block 502 of FIG. 5, the destination manager 240 determines whether a pop signal was received from the credit managed destination 140. If no pop signal was received (indicating that no data was released from the credit managed destination at that time), then control advances to block 512. If, at block 502, the destination manager 240 receives a pop signal from the credit managed destination 140 (indicating that data was sent or released from the credit managed destination 140), then the source manager 210 determines whether the counter is greater than zero at block 504. If the counter value is greater than zero at block 504, control advances to block 508 (no credit return is sent to the credit managed source 120). If, at block 504, the counter value is not greater than (e.g., the counter value is equal to zero), the source manager 220 returns credit to the credit managed source 120.

At block 508, the credit calculator 210 decrements the counter. At block 510, the source manager 220 asserts (or affirms) that the ready signal for the secondary source. In some examples, at block 510, if the secondary source 130 is a credit managed source, the source manager 220 may send a credit return to the secondary source 130.

At block 512, the source manager 220 determines whether a pop signal was received from the secondary source 130. If no pop signal has been received from the secondary source 130 at block 512, then control advances to block 520. If, at block 512, a pop signal has been received from the secondary source 130, the credit calculator 210 increments the counter at block 514. At block 516, the source manager 220 determines whether the counter value is equal to the allotted slots for the secondary source 516. If, the counter value is not equal to the allotted slots for the secondary source 130 in the credit managed destination 140 (e.g., indicating the allotted slots in the credit managed destination 140 are not full), control advances to block 520. If the counter value is equal to the allotted slots for the secondary source 130 (e.g., indicating the allotted slots in the credit managed destination 140 are full), then at block 518, the source manager 220 deasserts the ready signal. In some examples, at block 518, if the secondary source 130 is a credit managed source, the source manager 220 may not send credit returns to the secondary source 130.

At block 520 of the example process 500 in FIG. 5, the multi-source credit manager 110 determines whether to continue credit management. If the multi-source credit manager 110 is to continue managing credit returns and/or the ready signal for the credit managed source 120 and/or the ready signal 130, control returns to block 502. If the multi-source credit manager 110 is not to continuing managing credit returns or the ready signal for the credit managed source 120 and/or the secondary source 130 (e.g., due to a failure, shutdown of the system or process 500, etc.), then the example process 500 ends.

As mentioned above, the example processes of FIGS. 4 and/or 5 may be implemented using coded instructions (e.g., computer and/or machine readable instructions) stored on a non-transitory machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
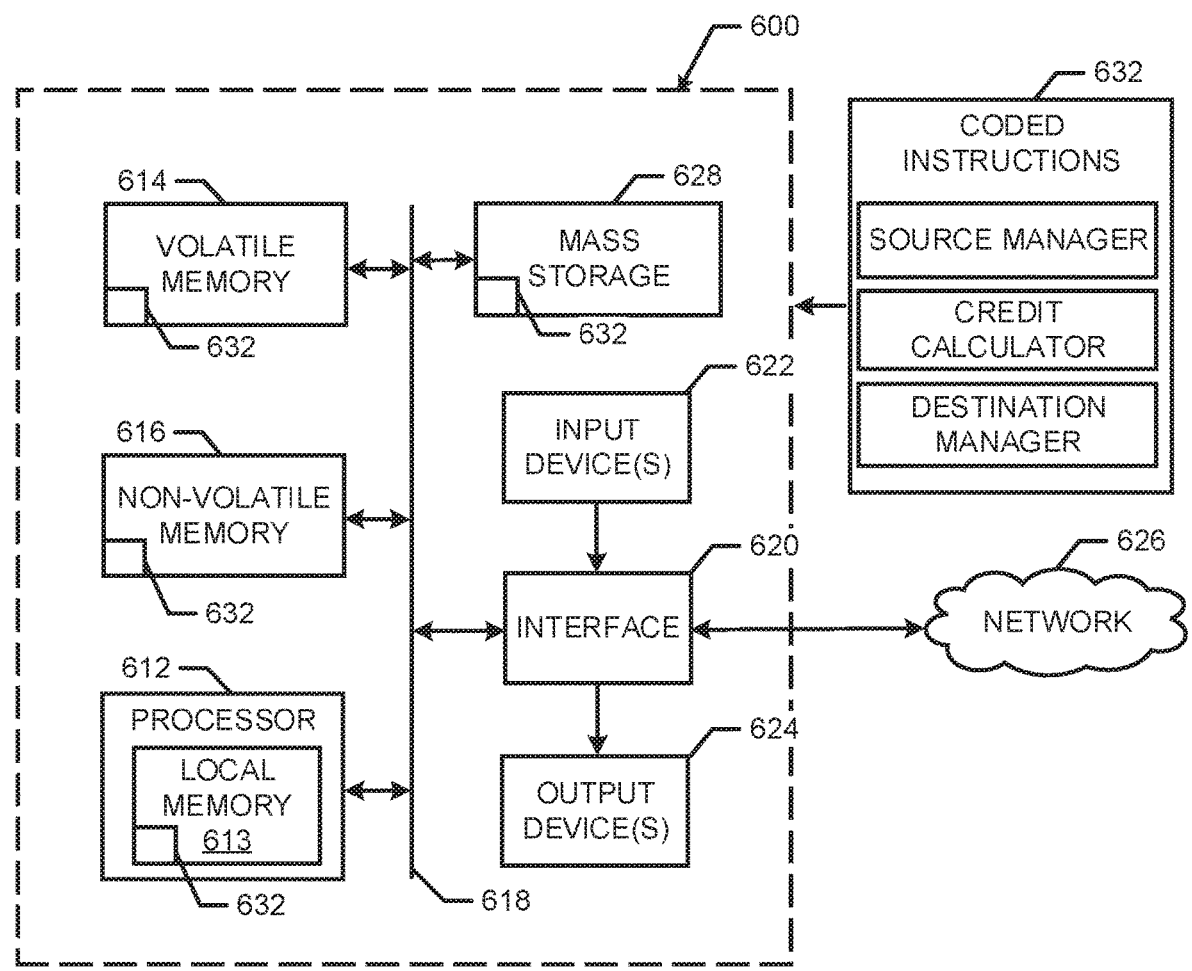
FIG. 6 is a block diagram of an example processor platform capable of executing the instructions of FIGS. 4 and/or 5 to implement the multi-source credit manager of FIG. 2.

FIG. 6 is a block diagram of an example processor platform 600 capable of executing the instructions of FIGS. 4 and 5 to implement the multi-source credit manager 110 of FIG. 2. The example processor platform 600 may be or may be included in any type of apparatus, such as a server, a personal computer, a mobile device, an Internet appliance, or any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory, a persistent, byte-addressable memory accessible via a memory fabric and/or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 4 and/or 5 may be stored in the mass storage device 628, in the local memory 613 in the volatile memory 614, in the non-volatile memory 616, and/or on a removable tangible machine readable storage medium such as a CD or DVD.

The above disclosed methods, apparatus and articles of manufacture may enable control of credit returns to sources of a multi-source, single destination credit managed communication system. Examples herein allow for control of credit returns to multiple sources and/or allowance of data transmission to the credit managed destination when space becomes available in the credit managed destination regardless of the type of data (or the source from which the data originated) that leaves the credit managed destination. Accordingly, examples herein ensure that the capacity is not exceeded for the credit managed destination despite multiple sources (whether all credit managed sources or not) being coupled to the credit managed destination.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage credits in a multi-source credit managed communication system, performed by a multi-source credit manager, the method comprising:

allocating a first amount of slots of a credit managed destination for a credit managed source and a second amount of slots of the credit managed destination for a secondary source;

responsive to a pop of data from the secondary source to the credit managed destination, incrementing a counter, wherein:

the counter remains unchanged responsive to a pop of data from the credit managed source to the credit managed destination, and the counter indicates when the credit managed source or the secondary source can send data to the credit managed destination; and responsive to a pop of data from the credit managed destination, the pop indicating that the credit managed destination has released data:

if the counter is zero, returning a credit to the credit managed source regardless of whether the popped data originated at the credit managed source or at the secondary source; and if the counter is greater than zero, decrementing the counter regardless of whether the popped data originated at the credit managed source or at the secondary source.

2. The method as defined in claim 1, wherein the counter is for the amount of pops from the secondary source to the credit managed destination and the amount of pops from the credit managed destination, the counter tracking an amount of data sent from the secondary source to the credit managed destination, and an amount of data sent from the credit managed destination.

3. The method as defined in claim 1, wherein credit returns providing an ability for the credit managed source to send data to the credit managed destination are controlled based on the second amount of slots and based on a value of the counter.

4. The method as defined in claim 1, further comprising: setting a ready signal to the secondary source based on the counter and the second amount of slots, the ready signal indicating whether the secondary source is able to send data to the credit managed destination.

5. The method as defined in 1, further comprising:

if the counter is less than the second amount of slots, setting a ready signal to indicate that the secondary source is able to send additional data to the credit managed destination; and if the counter is equal to the second amount of slots, setting the ready signal to indicate that the secondary source is unable to send additional data to the credit managed destination.

6. The method as defined in claim 1, wherein the credit managed destination comprises a first-in first-out (FIFO) buffer, and the credit managed destination indicates a pop when a unit of data leaves the FIFO buffer.

7. The method as defined in claim 1, wherein the secondary source is a non-credit managed source.

8. A non-transitory computer readable storage medium comprising instructions that, when executed, cause a machine to at least:

in response to a pop signal received from a credit managed destination, adjust a counter of a credit managed communication system regardless of whether the pop signal corresponds to data originated at a credit managed source or at a secondary source, wherein the pop signal from the credit managed destination indicates that the credit managed destination has released data;

in response to a pop signal received from the secondary source of the credit managed destination, adjust the counter, wherein the pop signal from the secondary source indicates that data was sent from the secondary source to the credit managed destination;

in response to a pop signal received from the credit managed source, the counter remaining unchanged; and control credit returns to the credit managed source based on a value of the counter when the pop signal is received from the credit managed destination.

9. The non-transitory machine readable storage medium of claim 8, wherein the instructions, when executed, further cause the machine to:

decrement the counter when the pop signal is received from the credit managed destination unless the counter is equal to zero; and increment the counter when the pop signals are received from the secondary source unless the counter is equal to an amount of slots of the credit managed destination allocated for the secondary source.

10. The non-transitory machine readable storage medium of claim 9, wherein the instructions, when executed, further cause the machine to:

send a credit return to the credit managed source when the value of the counter is equal to zero when the pop signal is received from the credit managed destination.

11. The non-transitory machine readable storage medium of claim 9, wherein the instructions, when executed, further cause the machine to:

when the secondary source is a non-credit managed source, control a ready signal for the secondary source based on the counter value, the ready signal to indicate when the secondary source can send data to the credit managed destination.

12. The non-transitory machine readable storage medium of claim 11, wherein the instructions, when executed, further cause the machine to:

assert the ready signal when the counter is greater than zero and less than the amount of slots allocated for the secondary source, indicating that the secondary source is to send data to the credit managed destination.

13. The non-transitory machine readable storage medium of claim 11, wherein the instructions, when executed, further cause the machine to:

deassert the ready signal when the counter is equal to the amount of slots allocated for the secondary source, indicating that the secondary source is not to send data to the credit managed destination.

14. The non-transitory machine readable storage medium of claim 9, wherein the instructions, when executed, further cause the machine to:

when the secondary source is a credit managed source, send a credit return when the counter is greater than zero and less than the amount of slots allocated for the secondary source, indicating that the secondary source is to send data to the credit managed destination.

15. An apparatus to control credit returns in a credit managed communication system, the apparatus comprising:

a processor;

a memory storing code instructing that the processor execute:

allocate an amount of slots of a credit managed destination for data received from a secondary source of the credit managed destination, the credit managed destination to receive data from a credit managed source and the secondary source;

provide credit returns to the credit managed source based on a counter that tracks data sent from the secondary source to the credit managed destination in the credit managed communication system; and increment the counter when data is sent from the secondary source to the credit managed destination and decrement the counter when data is released from the credit managed destination regardless of whether the data originated at the credit managed source or at the secondary source.

16. The apparatus of claim 15, wherein the processor is to send a credit return to the credit managed source when counter is equal to zero when the data is released from the credit managed destination.

17. The apparatus of claim 15, wherein, when the counter is between zero and the amount of slots of the credit managed destination when the data is released by the credit managed destination, the processor is to send credit returns to the secondary source if the secondary source is a credit managed source, or assert a ready signal for the secondary source if the secondary source is not a credit managed source, indicating that the secondary source is able to send data to the credit managed destination.

\* \* \* \* \*